(12) United States Patent
Oikawa

(10) Patent No.: US 7,382,967 B2
(45) Date of Patent: Jun. 3, 2008

(54) VIDEO DISK PLAYER

(75) Inventor: Taku Oikawa, Kawaguchi (JP)

(73) Assignee: Alpine Electronics, Inc., Tokyo (JP)

( * ) Notice: Subject to any disclaimer, the term of this patent is extended or adjusted under 35 U.S.C. 154(b) by 944 days.

(21) Appl. No.: 10/653,691

(22) Filed: Sep. 2, 2003

(65) Prior Publication Data

US 2004/0126102 A1 Jul. 1, 2004

(30) Foreign Application Priority Data

Sep. 2, 2002 (JP) ............................ 2002-257207

(51) Int. Cl.
*H04N 5/91* (2006.01)
*H04N 5/00* (2006.01)
*H04N 7/00* (2006.01)

(52) U.S. Cl. ..................... 386/70; 386/125; 386/126; 386/95

(58) Field of Classification Search ................ 386/1, 386/46, 52–54, 95, 96
See application file for complete search history.

(56) References Cited

U.S. PATENT DOCUMENTS

| | | | |
|---|---|---|---|
| 4,890,168 A | 12/1989 | Inoue et al. | |
| 5,170,159 A * | 12/1992 | Kawabata et al. | 340/825.22 |
| 6,085,021 A | 7/2000 | Tozaki et al. | |
| 6,222,983 B1 * | 4/2001 | Heo | 386/96 |
| 6,295,409 B1 | 9/2001 | Ikeda | |
| 6,745,164 B2 * | 6/2004 | Akita | 704/272 |
| 6,931,200 B1 * | 8/2005 | Yamada et al. | 386/95 |
| 2001/0046371 A1 * | 11/2001 | Ando et al. | 386/70 |
| 2002/0051625 A1 * | 5/2002 | Yamamoto et al. | 386/95 |
| 2002/0087303 A1 | 7/2002 | Sugiyama | |

FOREIGN PATENT DOCUMENTS

| | | |
|---|---|---|
| JP | 63-288444 | 11/1988 |
| JP | 05-204553 | 8/1993 |
| JP | 08-180507 | 7/1996 |
| JP | 10-143175 | 5/1998 |
| JP | 10-334596 | 12/1998 |
| JP | 11-162148 | 6/1999 |
| JP | 2002-203366 | 7/2002 |

* cited by examiner

*Primary Examiner*—Marsha D. Banks-Harold
*Assistant Examiner*—Michael Choi
(74) *Attorney, Agent, or Firm*—Brinks Hofer Gilson & Lione

(57) ABSTRACT

In a video disk player for playing back a disk containing a plurality of music pieces, each recorded as a combination of video data and corresponding audio data, a picture-search process section for mainly searching the video data includes an audio-data buffer memory, and upon receipt of a picture search instruction, audio data of a music piece previously designated to be continuously played back is recorded. When the picture search is performed, the video data of the music pieces contained in the disk is sequentially played back for a predetermined time interval, for example, 30 seconds, on the basis of an instruction of a video-data playback control section for search. On that occasion, the video disk player continuously plays back the audio data of the specific music piece recorded in the buffer memory regardless of change-over of the video data.

27 Claims, 10 Drawing Sheets

VIDEO DISK PLAYER

BACKGROUND OF THE INVENTION

1. Field of the Invention

The present invention relates to a video disk player which provides an operator with a menu for selecting a desired music piece when the operator plays back a disk such as a digital versatile disk (DVD) containing a large number of music pieces, each recorded as a combination of video data and corresponding music data.

2. Description of the Related Art

In recent years, CD-sized DVD-videos which can contain video data and sound of a long-running film or the like recorded therein have been widely available on the market, and DVD-video players for playing back the DVD-video have been widely used. Such DVD-videos played back by such a DVD-video player include those commercially available in a large quantity, which contain, other than the above film, for example, a large number of music pieces of a specific artist like a CD album and also contain image video linked to each music piece. Such DVD-videos include those commercially available on the market which contain popular music pieces and have especially attractive video data, such as dance video data, opera video data, and/or ballet video data which are suitable for the respective music pieces, recorded therein so as to be linked to music data of the respective music pieces.

Although a majority of such DVD-videos have moving pictures recorded therein, a part of them have a large number of still pictures recorded therein. Thus, hereinafter, "still pictures" and "moving pictures" are collectively called "video data" in the DVD-video.

Such DVD-videos include those commercially available on the market which contain, other than the above, video data of sightseeing spots and/or famous landscapes around the world, and have music data serving as background music recorded therein so as to correspond to the video data. Likewise, such DVD-videos include those commercially available on the market which contain a variety of video data such as outdoor sceneries, traveling sceneries of a locomotive, ocean sceneries, and/or video data of birds or flowers, and have music data serving as background music recorded therein so as to correspond to the video data. That is, such DVD-videos having music data recorded therein include those commercially available on the market in a large quantity which are increasingly used for mainly appreciating a variety of video data recorded therein. Hereinafter, a DVD containing music data and corresponding video data recorded in combination as mentioned above is called "a music DVD-video".

DVDs currently available on the market include DVD-audios having very high-quality audio data of music recorded in conformity with the DVD-audio standards, and the DVD-audios are played back by a DVD-audio player. Although the DVD-audio can contain an image recorded therein, only a still picture and text data can be included as image data in the audio data in conformity with the DVD-audio standards. In order to record moving pictures in such a DVD-audio, data of the moving picture in conformity with the standards of a normal DVD-video is independently recorded in a different part of the same DVD-audio where no DVD audio data is recorded.

In order to record music data and moving pictures in a DVD-audio so as to correspond to each other, the data is recorded in the same fashion as being recorded in the known DVD-video. Also, in order to play back the recorded data with a DVD-audio player, the data is played back with the same playback function of the DVD-audio player as that of the known DVD-video player. With this arrangement, on the occasion of playing back the DVD-audio, when the DVD audio data including the high-quality audio data is played back, still pictures serving as attractive video data recorded together with the audio data are sometimes sequentially displayed; for example, local pictures or paintings corresponding to the audio data are sometimes sequentially displayed every several seconds.

Accordingly, a DVD-audio having such still pictures recorded in conformity with the DVD-audio standards so as to correspond to the audio data recorded therein can be also called a disk containing a plurality of music pieces, each recorded as a combination of video data and corresponding audio data. Thus, this disk has substantially the same functions and features as those of the foregoing "music DVD-video".

Especially when moving pictures are recorded in the DVD-audio, similar data to that recorded in the known DVD-video is recorded in a different part of the DVD-audio where no DVD audio data is recorded. Thus, music data and corresponding video data are recorded in combination in the different part in the same fashion as recorded in the DVD-video, and the recorded music data and the corresponding video data are played back in the same fashion as played back from the DVD-video. Accordingly, a DVD-audio having such data recorded therein can be called "a music DVD-video".

As described above, the term "music DVD" defined in this specification means not only a DVD-video having music data and corresponding video data recorded in combination, but also a DVD-audio in which a data part having DVD audio data and still picture data recorded therein and another data part having music data and corresponding video data recorded in combination in substantially the same fashion as in the DVD-video are played back.

Meanwhile, when a disk to be played back contains a plurality of music pieces, each recorded as a combination of a large number of video data and corresponding music data, it is preferable that the DVD-video player display a menu screen ahead of a normal playback operation of the player so that an operator can select only a desired music piece from among the plurality of music pieces to be played back, or select a plurality of desired music pieces to be played back in a desired order. When the DVD-video player includes such a function, the operator selects a desired music piece by guessing the contents of video data or music pieces on the basis of the names of them displayed on a monitor screen, or by recalling his or her memory of having previously played the music pieces back.

However, the contents are often not clearly understandable with only such a menu screen on the monitor screen, whereby it is assumed that this often causes an operator to spend a long time selecting a desired one or to select a wrong video data or music piece which he or she did not originally desire. When the wrong music piece is selected and played back, the operator becomes frustrated with the unexpected music piece.

As countermeasures against the above problem, there has been proposed a function similar to a music search function, conventionally used in an audio CD player, which sequentially plays back the starting parts of music pieces contained in the foregoing music DVD-video, each for a predetermined time interval, so as to inform an operator of the contents of the recorded music pieces.

When such a search function is employed, the operator views and listens to the starting parts of video data and music pieces automatically and sequentially played back in every predetermined time interval; determines during playback whether the video data or music data is a desired one; and puts a mark or the like on the desired one if needed. Furthermore, in order to select a plurality of music pieces, by repeating the same selection operation while the following video data and music piece are played back, the operator selects only video data and music pieces the operator wants to play back, and enters an instruction for their playback order if needed.

As described above, when the DVD-video player includes the function of playing back only the starting parts of video data and music data contained in the disk, each for a predetermined time interval, and for allowing an operator to select a desired one upon viewing an image played back from the video data and listening to music data played back from the music piece, the video data and the music data to be played back are recorded in combination so as to correspond to each other and are then played back in conjunction with each other. Thus, when the operator wants to mainly view one or some video data from a music DVD video containing the video data and the corresponding music data which the operator will play back, music data provided together with the corresponding video data is changed over at the same time as when the video data which the operator is carefully reviewing is changed over.

With this arrangement, only the introductory parts serving as the starting parts of music pieces are usually sequentially played back, thereby often causing the operator to hear unwanted music parts of the music pieces one after another. Even when only part of an effective music part of each music piece is played back, following the corresponding introductory part, it is not desirable to the operator to sequentially play back such music parts which are of no interest as a whole when the operator is selecting a desired one while carefully reviewing video data, thereby often frustrating the operator.

That is, with an audio CD player having the music search function employed therein for playing back only the starting parts of the music pieces contained in a CD as mentioned above and for sequentially informing an operator of the contents of the recorded music, the change-over of the music pieces does not bother the operator since the operator concentrates on listening to the contents of the music data and thus expects the change-over of the music pieces. Also, with a DVD player for playing back a music DVD-video having music data and corresponding video data as mentioned above, when an operator plays back the music DVD-video, expecting to mainly listen to the music data, the change-over of the music data does not bother the operator since the operator concentrates on listening to the contents of the music data as is the case with the foregoing CD. Also, even when the corresponding video data which is being played back is changed in accordance with the change-over of the music data, the change-over of the video data rarely bothers the operator since he or she can easily cope with this situation, for example, by turning away his or her eyes from the screen.

Different from the foregoing music search of the audio CD player, on the occasion of performing a search similar to the music search for a music DVD-video containing music data and video data as mentioned above, when an operator plays back the music DVD-video expecting to mainly view the video data, it is predicted that the change-over of the music data occurring in accordance with that of the video data often bothers the operator since the operator carefully watches the video data while the forgoing search function is in operation. Since the output of music data is adjusted by a volume operation, when the music data is produced with a relatively large volume which is often offensive to an operator, the volume must be adjusted so as to be turned down. However, cutting off the output of the music means that a part of the function which is originally included in the player for playing back a music DVD-video and which provides video data and corresponding music data during the foregoing search is not used. Thus, the function is not effectively used and the operator feels that something is lacking during the search.

The above-mentioned disadvantage causes the same problem as mentioned above to occur not only when the foregoing DVD-video is played back but also when video data is mainly searched during playback of a part of the DVD-audio having DVD audio data and corresponding still pictures recorded therein or having moving pictures and audio data recorded therein. In addition to the foregoing DVD, it is expected that a disk containing a large number of music pieces, each having video data and corresponding music data recorded in combination according to a further sophisticated data compressing and recording method different from the above-mentioned DVD data recording method will be commercially available on the market, and hence it is easily predicted that such a disk will have the same problem as mentioned above.

SUMMARY OF THE INVENTION

Accordingly, it is an object of the present invention to provide a video disk player which, on the occasion of playing back a video disk containing a plurality of music pieces, each recorded as a combination of video data and corresponding music data, does not frustrate an operator by avoiding a situation where, especially when the operator wants to mainly search video data for searching a desired music piece by sequentially playing back the recorded music pieces, the music pieces are changed over together with the corresponding video data, and also which can reproduce the music data recorded in the disk during the search.

A video disk player according to the present invention, for playing back a disk containing a plurality of music pieces, each recorded as a combination of video data and corresponding audio data, includes a video-data output section for sequentially playing back video data of a plurality of music pieces recorded in the disk, each for a predetermined time interval, upon receipt of at least one search signal for searching the music pieces recorded in the disk; and an audio-data output section for producing audio data of at least one music piece different from the music pieces whose video data is played back, upon receipt of the search signal. Thus, when the video data is played back and is displayed on a monitor screen in the recorded order of the music pieces during search of the recorded music pieces, since the audio data of only a specified music piece is produced, the music data is not frequently changed over during the search operation of the player, whereby frustrating an operator can be avoided.

In the video disk player according to the present invention, the audio-data output section includes a memory for recording the video data and the corresponding audio data of the disk, and only the audio data of the video and audio data recorded in the memory is played back and reproduced upon receipt of the search signal. Thus, in order to continuously produce the audio data of a specific music piece, it is sufficient to read out and provide the audio data recorded in the memory, whereby a playback part of the disk can be used for freely playing back the video data for search of any music pieces once the audio data for the music pieces is recorded in the disk. Since it is sufficient to take video data and corresponding audio data obtained at a data processor included in a known video disk player, in the memory as they are, so as to serve as the foregoing video data and corresponding audio data recorded in the memory, the present invention can be embodied without modifying the circuitry of the known video disk player.

Further, in the video disk player according to the present invention, the audio-data output section includes a memory for recording only the audio data of the disk, and the audio data recorded in the memory is reproduced upon receipt of the search signal. Thus, since it is sufficient to record only the audio data in the memory, the capacity of the memory can be small, thereby achieving a less expensive video disk player.

The video disk player according to the present invention may further include a data processor, and in the vide disk player, the audio data to be recorded in the memory is separated from a combination of video data and corresponding audio data of a music piece different from the music pieces whose video data is played back and which are taken in from the data processor. Thus, since it is sufficient to take only the video data and the corresponding audio data obtained at the data processor included in the known disk player, in the memory as they are, and to record only the audio data in the memory, the present invention can be embodied without modifying the circuitry of the known video disk player, and also the capacity of the memory can be small, thereby achieving a less expensive video disk player.

Also, the video disk player according to the present invention may further include a data processor, and in the video disk player, the audio data to be recorded in the memory is that separated by the data processor. Thus, since it is sufficient to take and record the audio data obtained at the data processor during its signal processing step, in the memory as it is, the present invention can be embodied with simple means, thereby achieving a less expensive video disk player.

In the video disk player according to the present invention, since compressed data read out from the disk is recorded in the memory for recording the audio data, the capacity of the memory can be made even smaller, thereby achieving a less expensive video disk player.

Further, in the video disk player according to the present invention, the audio-data output section may include a music-piece playback instruction section for identifying a music piece previously selected from the plurality of recorded music pieces and set by an operator. Thus, while the video data of the music pieces contained in the disk is sequentially reproduced, the operator can reproduce a desired music piece.

In the video disk player according to the present invention, the music-piece playback instruction section can identify a predetermined specific music piece when no music piece is set by an operator. Thus, when the operator has no desired music piece to be reproduced while the video data of the music pieces contained in the disk is sequentially reproduced, the predetermined specific music piece such as the first one of the music pieces contained in the disk is automatically selected.

In the video disk player according to the present invention, after the audio data of the first reproduced music piece is provided to the audio-data output section, the audio data of another music piece may be provided. Thus, as soon as the playback of the first reproduced specific music piece is finished, music data of the other music piece can be subsequently played back, whereby, even when a search operation takes a long time, it does not result in continuously playing back only the music data of a single music piece.

In the video disk player according to the present invention, the search signal for searching the music pieces recorded in the disk includes a signal for selecting a function for playing back and reproducing audio data of a music piece different than the music pieces whose video data is played back and another signal for selecting another function, and, upon receipt of the search signal for selecting the other function, video data and audio data of each of the music pieces recorded in the disk are reproduced in combination for a predetermined time interval in the recorded order of the music pieces in the disk. Thus, when the music pieces recorded in the disk are sequentially played back, each for a predetermined time interval, in order to search them, other than the function for continuously playing back music data of a specific music piece independently of the video data of the music pieces which are sequentially played back, an operator can select the other function for reproducing a combination of video data and corresponding audio data of each of the music pieces recorded in the disk in the recorded order of the music pieces, each for a predetermined time interval, whereby the operator can select and use a desired means among a variety of search means.

In one video disk player according to the present invention, a DVD-video is used as the disk. Among widely used DVD-videos, music DVD-videos containing a large number of music pieces, each having music data and corresponding video data recorded in combination, are commercially available in large quantity. Thus, with the video disk player, an operator can effectively search a desired music piece recorded in the music DVD-video.

In another video disk player according to the present invention, a DVD-audio is used as the disk. When an operator wants to mainly search video data of a data-recording part of the widely used DVD-audio in which still pictures serving as the video data are recorded in combination with corresponding high-quality audio data, the operator can search the video data without frequently changing over music data. Also, since a recording part of the DVD-audio in which moving pictures and music pieces are recorded has the same contents recorded therein as those in the DVD-video, when an operator wants to mainly search video data in the same fashion as mentioned above, the operator can search the video data without frequently changing over music data.

Also, in the video disk player according to the present invention, the video-data output section can include a playback time-interval setting section for arbitrarily setting a time interval for which each of the music pieces contained in the disk is sequentially played back. Thus, a time interval needed for sequentially searching the video data of each of the music pieces recorded in the disk can be arbitrarily set depending on the contents of the music pieces, the desire of an operator, and so forth, thereby achieving an accessible video disk player.

DESCRIPTION OF THE PREFERRED EMBODIMENTS

Figure 1:
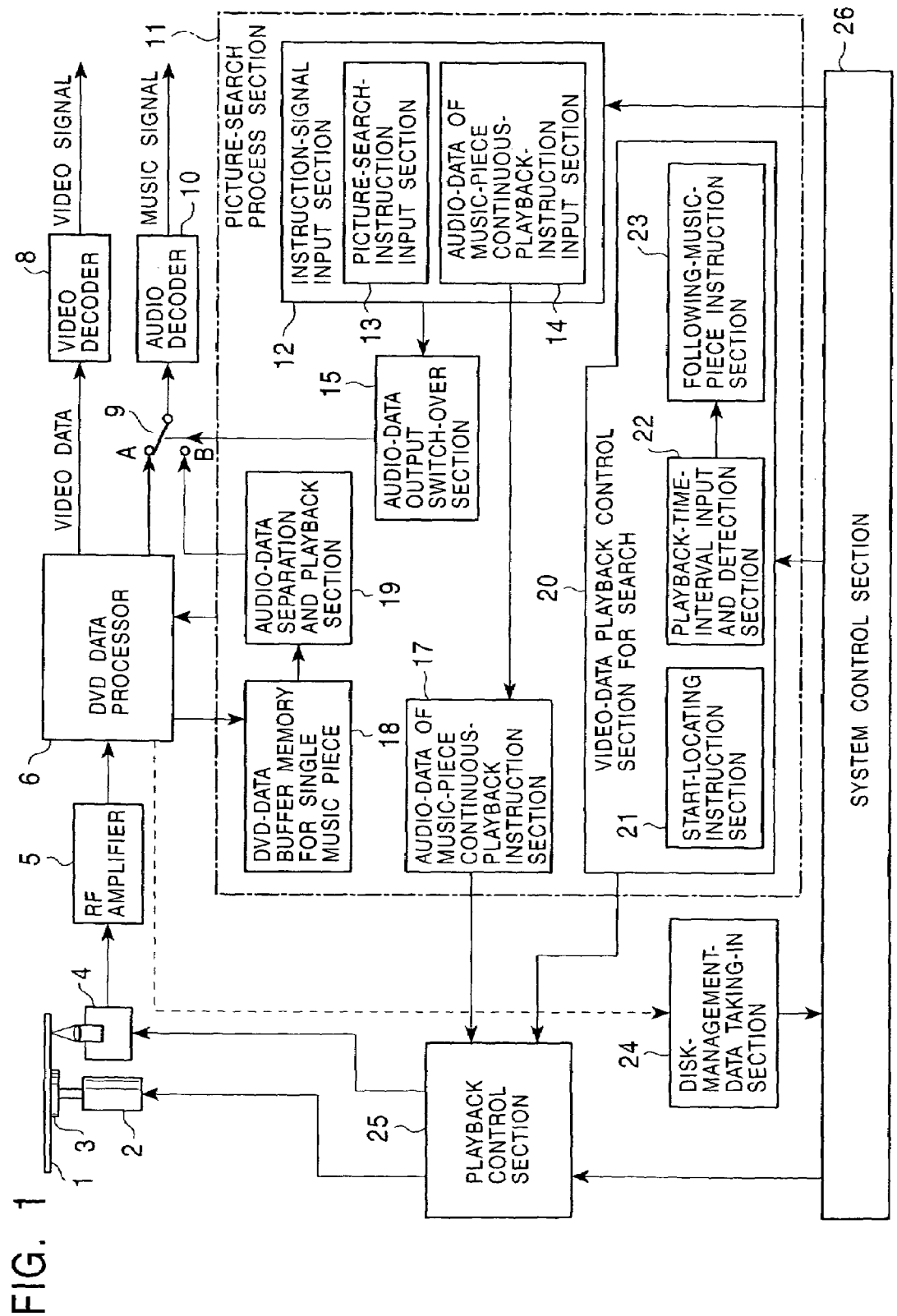
FIG. 1 is a functional block diagram of the major functional sections of a video disk player according to a first embodiment of the present invention and the mutual relationships among them.

Preferred embodiments of the present invention will be described with reference to the accompanying drawings. FIG. 1 is a functional block diagram of a video disk player according to a first embodiment of the present invention, which plays back a video disk containing a plurality of music pieces, each recorded as a combination of video data and corresponding music data, mainly illustrating functional blocks for performing the function of a DVD player, to which the video disk player is applied, for sequentially playing back only the video data and for continuously playing back and reproducing music data of at least one specific music piece in order to search the music pieces contained in a digital versatile disk (DVD) loaded in the DVD player by sequentially playing them back, each for a predetermined time interval.

Similar to a structure of a normal player, this DVD-video player has a structure in which a DVD 1 is fixed to a table 3 turned by a motor 2 and is controlled so as to turn at a predetermined speed. The disk has a recording layer formed on the lower surface thereof in the first embodiment shown in the figure and has an optical pickup 4 disposed therebelow so as to face the recording layer. When the optical pickup 4 emits a semiconductor laser beam which passes through an objective lens and forms a focal spot at a predetermined position, a photo diode receives the laser beam which is reflected at the disk and passes again through the objective lens, thus playing back a radio frequency (RF) signal recorded in the disk.

The RF signal is amplified by an RF amplifier 5 and enters a DVD data processor 6. The DVD data processor 6 demodulates MPEG data, that is, data compressed in an MPEG format which is a compressed recording format for DVD video data, and also performs digital signal processing of data for error correction processing, and for extraction processing of MPEG video data, audio data, and a variety of management information, which will be described later, such as disk identification marks, and user-operation management information. A video decoder 8 decrypts image data compressed in the MPEG format in accordance with the MPEG video data separated by the DVD data processor 6 and supplies it as a video signal to the following video processing circuit. When sub-picture data is included in the image data, it is independently decrypted by a sub-picture decoder; is combined with the data from the video decoder 8; and is supplied as a video signal.

Upon receipt of the audio data separated by the DVD processor 6, an audio decoder 10 decrypts it and then supplies it as a music signal to the following audio process section. The audio decoder 10 receives either of two kinds of audio data, one directly received from the DVD data processor 6 and entering a terminal A by an input changing-over section serving as a change-over switch 9 in the first embodiment shown in the figure, the other entering a terminal B from an audio-data separation and playback section 19 of a picture-search process section 11. Depending on data provided from the audio-data separation and playback section 19 of the picture-search process section 11, the change-over switch 9 may be disposed in front of the audio decoder 10 as shown in the figure or at an any appropriate position, for example, at the back of the audio decoder 10.

The change-over switch 9 can be switched over in accordance with an output of an audio-data output switch-over section 15 of the picture-search process section 11. As will be described later, when a picture search is performed, the change-over switch 9 is activated in response to a signal from the audio-data output switch-over section 15 and is switched over from the state shown in the figure to the terminal B connected to the audio-data separation and playback section 19.

Although a variety of DVD-videos are available because of the usage patterns and recording formats thereof, since the DVD used in the present invention has music data and corresponding video data recorded in combination and is mainly intended to be used such that an operator is especially interested in watching video data, a DVD-video suitable for recording moving pictures is mainly used as the DVD. A variety of data in the DVD-video read by the player shown in FIG. 1 is formatted in conformity to prescribed standards, as shown in FIGS. 8(a) to 8(f) by way of example.

Figure 8:
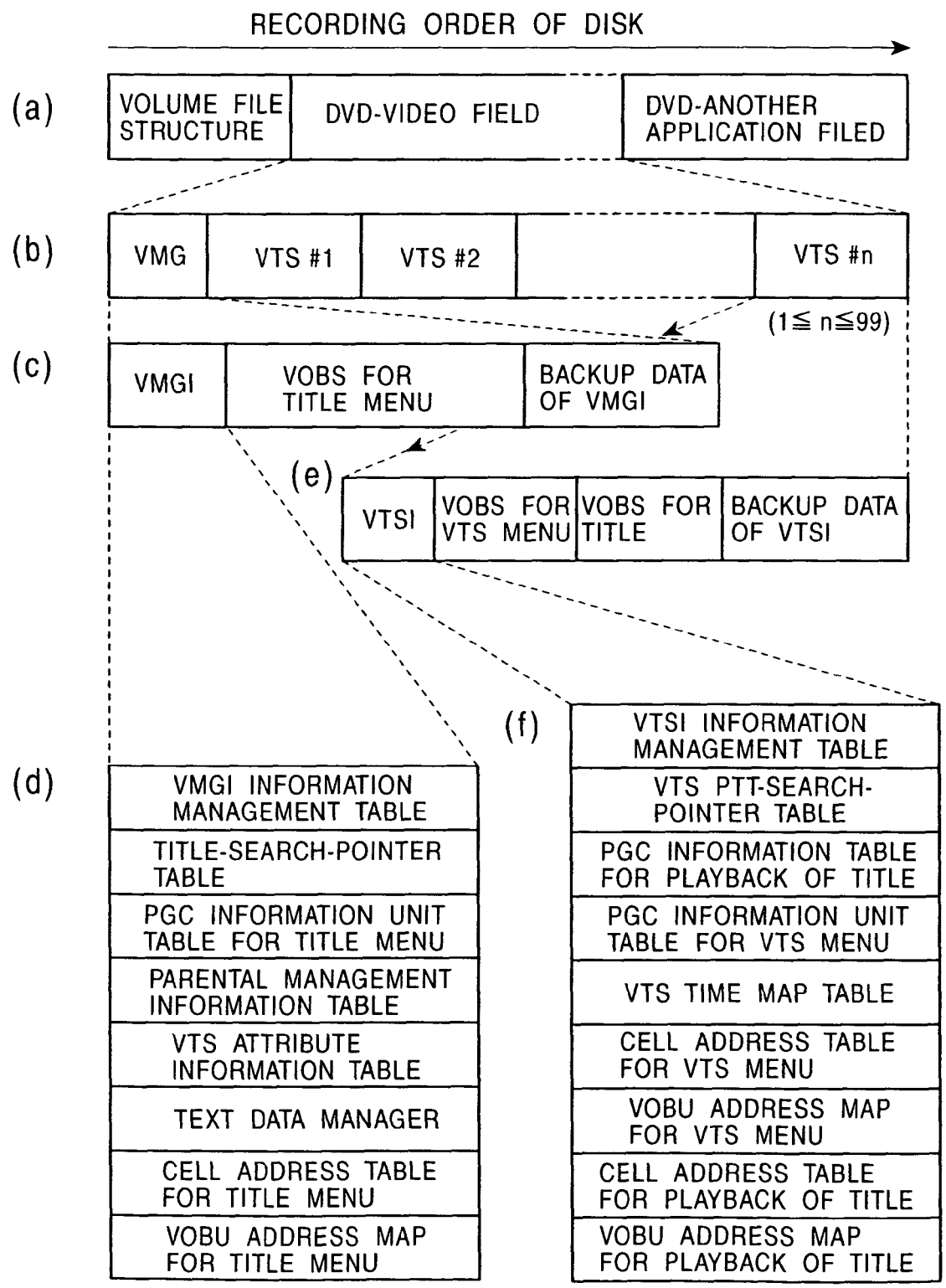
FIGS. 8(a) to 8(f) illustrate a data-recording format, according to which data is recorded in a DVD-video played back by any one of the video disk players according to the present invention.

More particularly, FIG. 8(a) illustrates a data structure of the disk in the recording order. As shown in FIG. 8(b), in the data structure, a DVD-video field serving as a major data recording field is formed by a video manager (VMG) serving as an overall general information field and video title sets (VTSs) dividable into up to 99 sets. As shown in FIG. 8(c), the VMG is formed by video manager information (VMGI) serving as a main management field, a video object set (VOBS) for title menu, and field data of the VMGI. A variety of data is recorded in the VMGI as shown in FIG. 8(*d*).

Also, as shown in FIG. 8(*e*), video title set information (VTSI) serving as a management information field, a variety of VOBSs in which actual video data and audio data are recorded, and backup data of the VTSI are recorded in each VTS shown in FIG. 8(*b*). A variety of data is recorded in each VTSI as shown in FIG. 8(*f*).

When the above-mentioned DVD is a disk in which music data is recorded, that is, it is a music DVD-video, data of each music piece is recorded in a corresponding one of the VTS #1 to VTS #n shown in FIG. 8(*b*); information for playing back each music piece is recorded in the corresponding VTSI shown in FIG. 8(*e*); and information about video data, audio data, etc., for making up the music piece is recorded in the corresponding VOBS.

Figure 9:
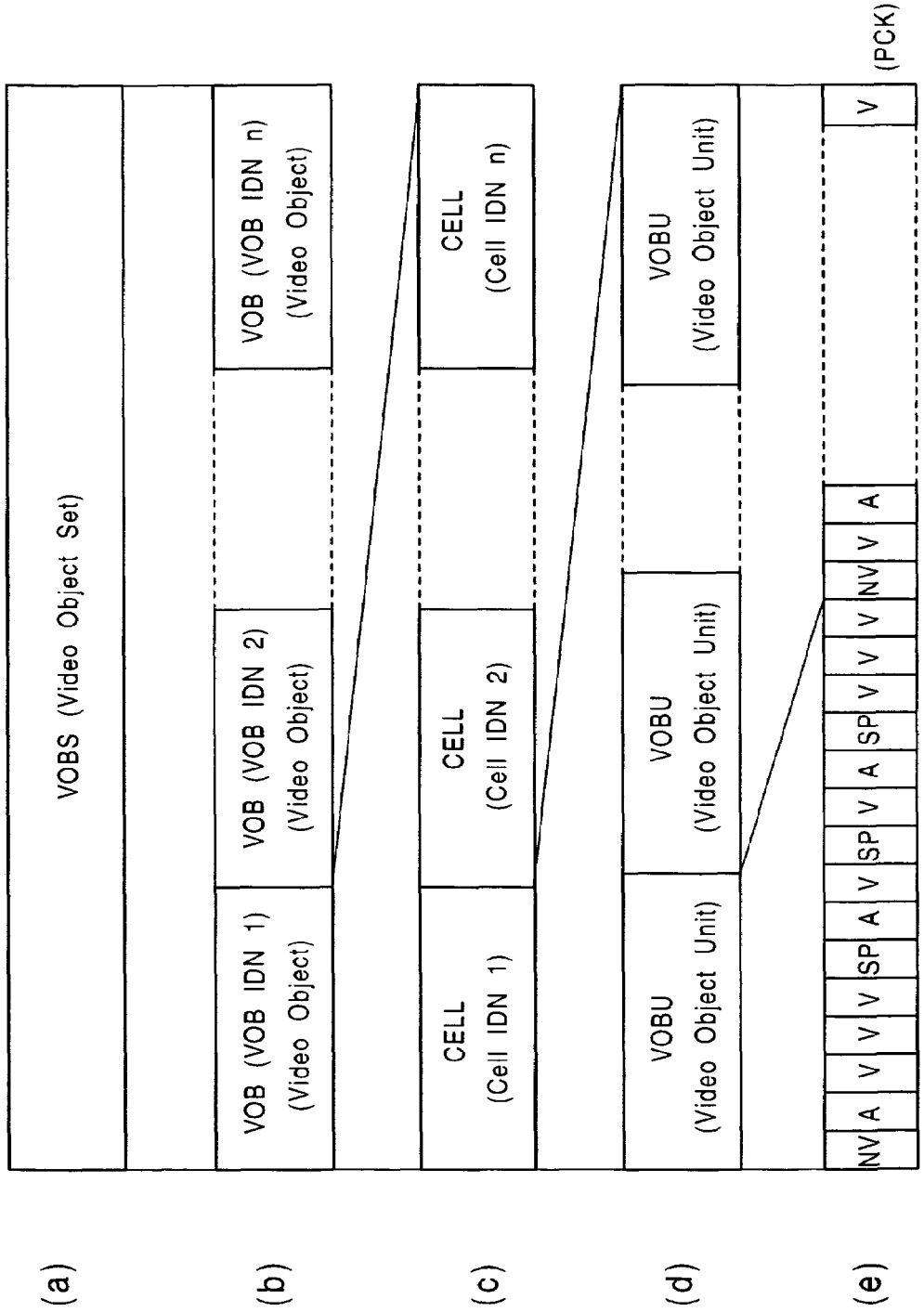
FIGS. 9(a) to 9(e) illustrate a data-recording format of a video object set recorded in the DVD-video.

As shown in FIGS. 9(*a*) and 9(*b*) by way of example, the VOBS is formed by a plurality of video objects (VOBs) managed as a group of recorded data. As shown in FIG. 9(*c*), each VOB is divided into a large number of cells (CELLs), and, as shown in FIG. 9(*d*), each cell is divided into a plurality of video object units (VOBUs), each serving as a minimum unit of recorded data. Meanwhile, there are a variety of DVD-videos containing music data and corresponding video data recorded in combination, especially depending on a length of a single music piece recorded therein, for example, a disk in which a single long music piece such as a classic symphony is recorded, a disk in which a large number of small music pieces are recorded, a disk in which a large number of collective pieces, such as pops, of a single artist are recorded, a disk in which collective pieces of a large number of artists are recorded; and also, depending a quantity of recorded data, for example, a disk having a recording single layer formed on its single surface, and a disk having double recording layers formed on its two surfaces. Accordingly, each DVD has its own way of allocating VOBSs, VOBs, and CELLs to each group of music pieces and each music piece to be recorded.

Data obtained for the total playback time interval ranging from 0.4 seconds to 1.2 seconds is recorded in each VOBU serving as a minimum unit of a data-recording unit. A plurality of groups of pictures compressed in the MPEG format is included in the VOBU. As shown in FIG. 9(*e*), the VOBU is formed by a navigation pack (NV-pack or NV-PCK) in which information for managing the VOBU is recorded, a video pack (V-pack or V-PCK) in which main video data is recorded, an audio pack (A-pack or A-PCK) in which music data is recorded, and a sub-picture pack (SP-pack or SP-PCK) in which auxiliary video data such as a subtitle is recorded.

Each VOBU is managed in accordance with data in the management pack which is called the NV-pack. A playback time of the VOBU serving as management data for the overall VOBU, and the size of the V-pack of main video data whose playback is controlled by the NV-pack are recorded in the NV-pack. Also, in addition to a variety of management information such as an elapsed time from the beginning of a CELL including the VOBU, an address and a category of the NV-pack, and user-operational control information are recorded in the NV-pack.

Figure 10:
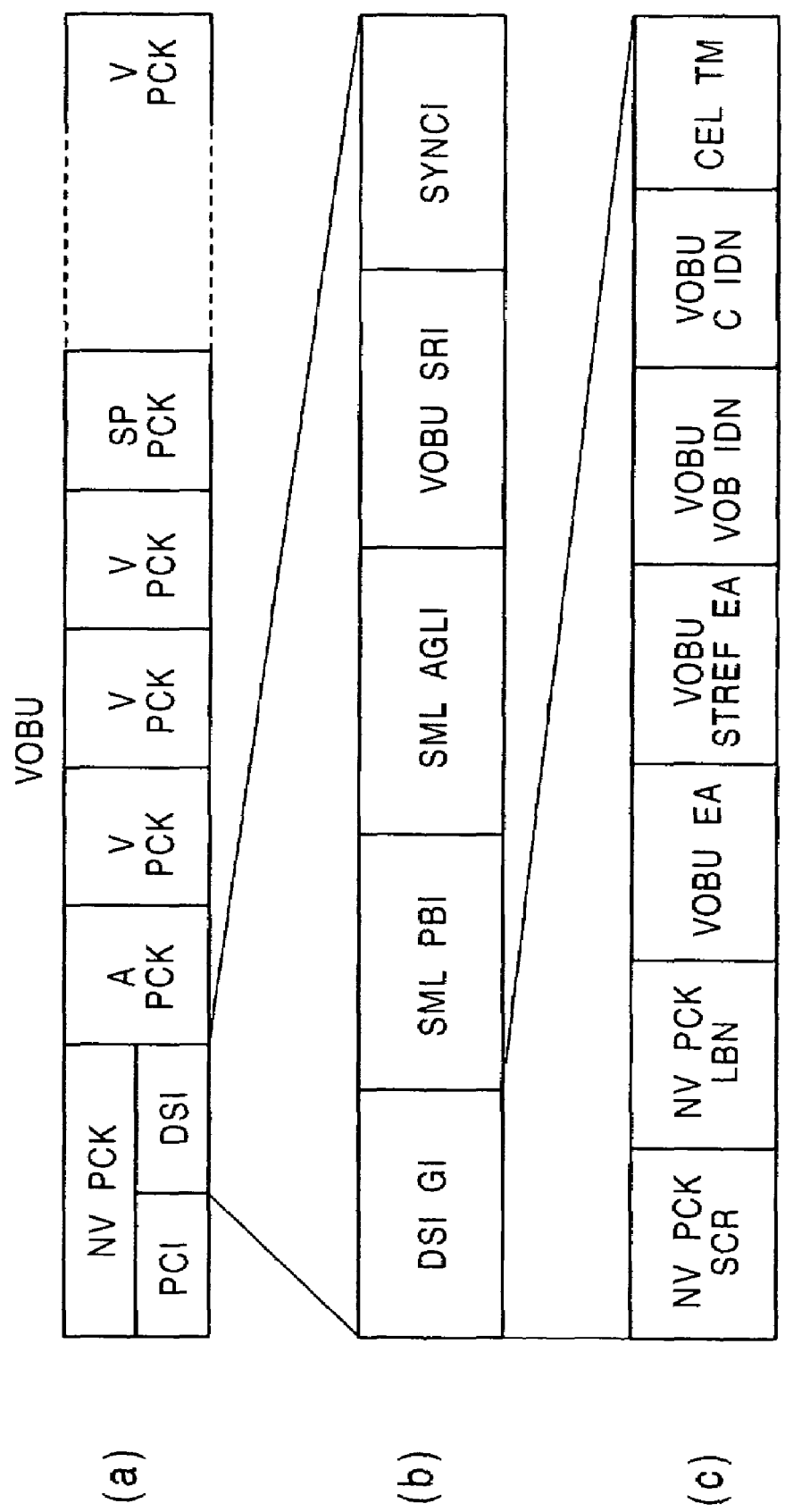
FIGS. 10(a) to 10(c) illustrate a data-recording format of a video object unit recorded in the DVD-video.

The NV-pack has a data structure consisting of presentation control information (PCI) serving as control information for displaying video data and data search information (DSI) serving as search information of each data, as shown in FIG. 10(*a*) by way of example. Also, recorded in the PCI is a variety of information such as general information of the overall PCI, angle changing information in the case of non-seamless, highlight-displaying information of a subtitle or the like in a predetermined field, and recording information of main video data, auxiliary video data, and sound data.

As shown in FIG. 10(*b*) by way of example, recorded in the DSI are general information of the overall DSI (DSI GI), playback management information in the case of seamless (SML PBI), angle information in the case of seamless (SML AGLI), VOBU search information (VOBU SRI) such as a time interval between adjacent VOBUs, synchronous information (SYNCI) indicating the coincidence between sound data and auxiliary video data, and so forth.

Furthermore, as shown in FIG. 10(*c*) by way of example, recorded in the general information of the DSI (DSI GI) are a variety of groups of data such as a system clock reference of the NV-pack (NV PCK SCR), address of the NV-pack (NV PCK LBN), an end address of the VOBU (VOBU EA), and user-operation control information about the VOBU, an elapsed time of the beginning of the cell including the VOBU (CEL TM), and so forth.

By playing back the DVD-video 1 formatted in the above-mentioned format with the player shown in the figure, the DVD data processor 6 takes in only data corresponding to a single music piece from the DVD video data, and also, the data is recorded in a DVD-data buffer memory 18 for a single music piece on the basis of the instruction from the picture-search process section 11 as described above. A variety of disk management data taken out from the DVD data processor 6 is received by a disk-management-data taking-in section 24 and then by a system control section 26 and is recorded in respective buffer memories. Thus, when a variety of data is processed and is provided to the playback control section 25 so as to drive and control the pickup 4, the player can read the data recorded in any location of the disk.

In the functional block diagram shown in FIG. 1, a picture search function according to the present invention is mainly performed in the picture-search process section 11. The picture-search process section 11 includes an instruction-signal input section 12, which receives an operation-instruction signal entered by an operator with a signal inputting section (not shown) and which receives a variety of preset information previously set by the operator.

The instruction-signal input section 12 includes a picture-search-instruction input section 13. On the occasion of playing back the DVD-video in which music data and corresponding video data are recorded in combination, when the operator wants to search contents, especially video contents in the main, contained in the disk in order to know what contents are contained in the disk, the operator enters a picture search instruction, for example, by selecting a menu screen such as "Picture Search" with a cursor, from search functions displayed on the menu screen, so as to enter this instruction signal into the picture-search-instruction input section 13.

An instruction signal previously set by the operator and designating at least one specific music piece which will be continuously played during picture search is entered into an audio-data of music-piece continuous-playback-instruction input section 14 included in the instruction-signal input section 12. The signal entered into the audio-data of music-piece continuous-playback-instruction input section 14 is supplied to an audio-data of music-piece continuous-playback instruction section 17 and is then supplied to a playback control section 25 so as to play back the specific music piece. Although the instruction signal for playing back the specific music piece is entered from the picture-search process section 11 to the playback control section 25, as illustrated in the figure by way of example, the above instruction can be achieved with another means such as the system control section. Thus, for purposes of illustration of the picture search process function, the instruction sections for providing instructions to the playback control section 25 are included in the picture-search process section 11 in the figure by way of example only.

The picture-search process section 11 includes the audio-data output switch-over section 15, which is activated by a signal, particularly from the picture-search-instruction input section 13, and which operates the change-over switch 9 so as to be switched over between the terminal A for transmitting audio data from the DVD data processor 6 directly to the audio decoder 10 and the terminal B for transmitting audio data of a specific music piece, to be played back on the basis of the instruction of continuous playback of music pieces recorded in the audio-data separation and playback section 19, to the audio decoder 10.

Figure 2:
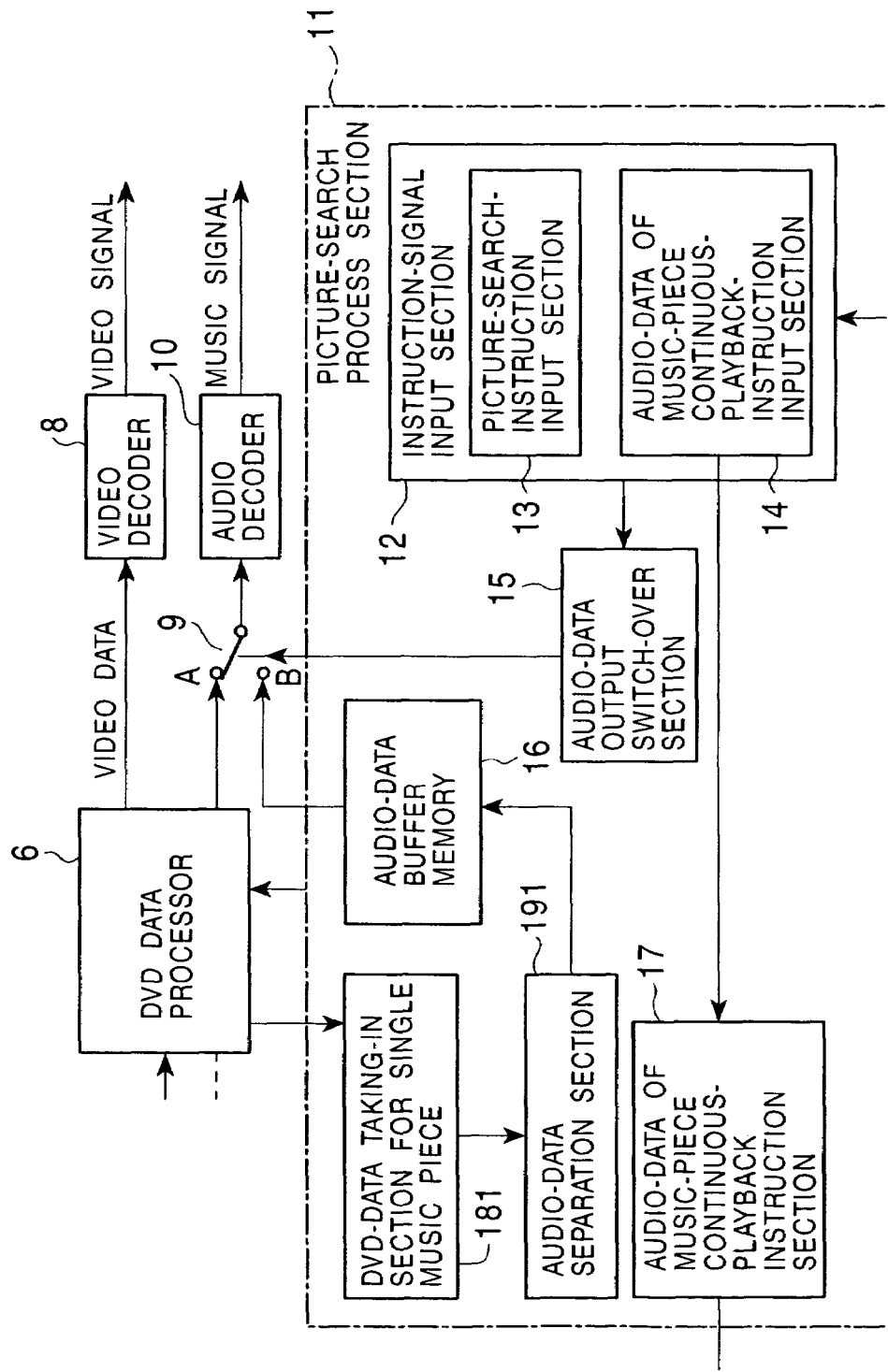
FIG. 2 is a functional block diagram of the major functional sections of a video disk player according to a second embodiment of the present invention and the mutual relationships among them, especially illustrating functional sections which are different from those shown in FIG. 1 and neighboring functional sections.

In FIG. 1 shown by way of example, the audio data of the specific music piece supplied to the terminal B is illustrated such that only the audio data of the video and audio data recorded in the DVD-data buffer memory 18 for a single music piece is played back. Alternatively, as shown in FIG. 2 by way of example, illustrating a functional block diagram of the major functional sections of a video disk player according to a second embodiment of the present invention, especially illustrating functional sections which are different from those shown in FIG. 1 and neighboring functional sections, the video disk player may have a structure in which DVD data corresponding to a single music piece is received by a DVD-data taking-in section 181 for a single music piece from the DVD data processor 6; audio data is separated from the DVD data by a DVD-data playback section of an audio-data separation section 191; and the separated audio data is recorded in an audio-data buffer memory 16 and then is supplied to the terminal B.

Figure 3:
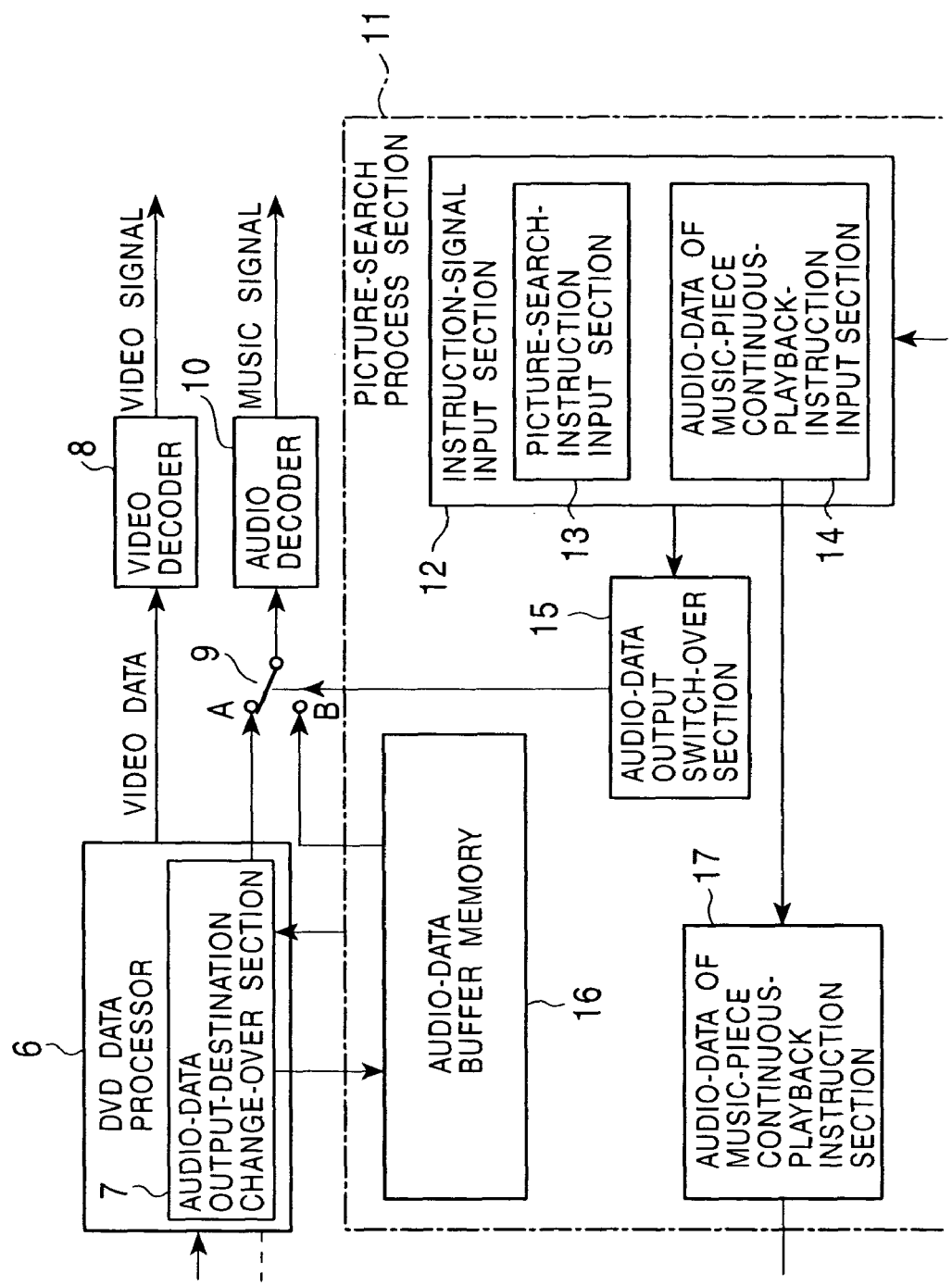
FIG. 3 is a functional block diagram of the major functional sections of a video disk player according to a third embodiment of the present invention and the mutual relationships among them, especially illustrating functional sections which are different from those shown in FIG. 1 and neighboring functional sections.

Alternatively, as shown in FIG. 3 by way of example, illustrating a functional block diagram of the major functional sections of a video disk player according to a third embodiment of the present invention, especially illustrating functional sections which are different from those shown in FIG. 1 and neighboring functional sections, the video disk player may have a structure in which the DVD data processor 6 includes an audio-data output-destination change-over section 7 so as to supply audio data demodulated by the DVD data processor 6 to either the audio decoder 10 to which the audio data is supplied at the time of normal playback when no external instruction is provided or the audio-data buffer memory 16 to which the audio data is supplied when the audio-data output-destination change-over section 7 is changed over thereto in accordance with a signal from the picture-search process section 11, which will be described later.

In this case, instead of recording the audio data separated by the DVD data processor 6 directly into the audio-data buffer memory 16, for example, data corresponding to a single music piece decoded from the MPEG data by the audio decoder 10 or audio data processed in the further following data process section can be recorded, although the foregoing change-over switch is required to be disposed at each data process section. Meanwhile, since the remaining part of the DVD data from which the audio data has been just separated by the DVD data processor 6 as shown in the figure is data compressed in the MPEG format, when this data is recorded, the capacity of a memory for recording data of a single piece of music can be made small.

Returning to FIG. 1, the picture-search process section 11 includes a video-data playback control section 20 for search, which receives a variety of signals from the system control section 26 and which includes functional sections such as a start-locating instruction section 21 for instruction of locating the start of each music piece, a playback-time input and detection section 22 for receiving a preset playback time of a music piece to be played back for search and also for detecting a playback time of a music piece whose start is located and which is currently being played back, a following-music piece instruction section 23 for receiving a playback-time-over signal of the currently-played-back music piece from the playback-time input and detection section 22 and for instruction of playing back the following music piece which follows the currently-played-back music piece, and so forth. Thus, in accordance with a variety of instruction signals from the video-data playback control section 20 for search, the playback control section 25 can sequentially perform locating the start of a designated music piece, playing it back for a predetermined time interval, and locating the start of the following music piece. Meanwhile, the above-mentioned function is similar to a playback control function of a music search function employed in a conventional compact disk (CD).

Figure 4:
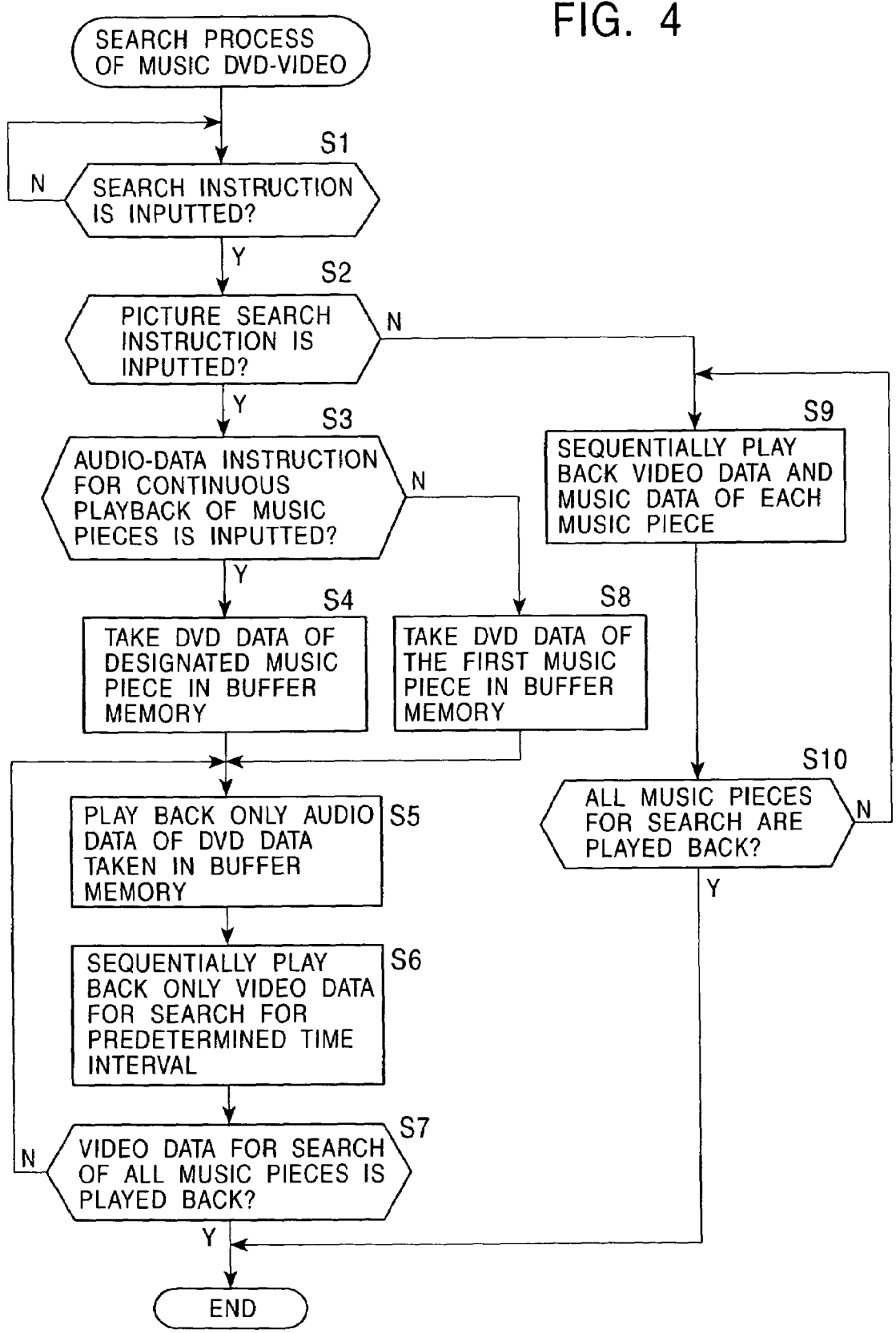
FIG. 4 is an operational flow diagram of a search operation of a music DVD-video of the video disk player shown in FIG. 1, according to the first embodiment.

In the DVD player having the above-described functional blocks, a search process of a music DVD-video containing music data and corresponding video data recorded in combination is sequentially carried out according to an operational flow illustrated in FIG. 4 by way of example. This operational flow will be described with reference to the functional block diagram shown in FIG. 1, and example images shown in FIGS. 7A and 7B.

In order to carry out the search process of a music DVD-video shown in FIG. 4, it is first determined in Step S1 whether a search instruction is entered. If NO, the process remains in standby while repeating the above step, and if YES, it is determined in Step S2 whether the instruction is a picture search instruction. Such a picture search instruction can be determined, depending on whether an instruction signal is entered into the picture-search-instruction input section 13 of the instruction-signal input section 12 of the picture-search process section 11 shown in FIG. 1.

Figure 7A:
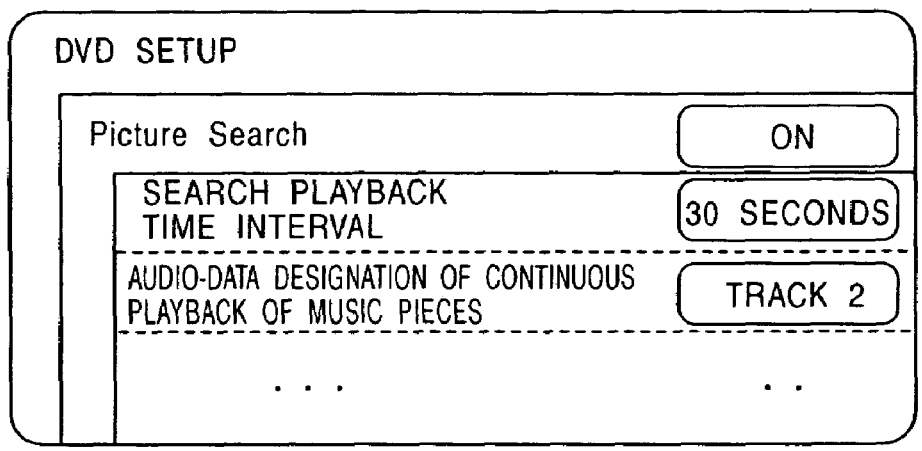
FIGS. 7A and 7B are display examples of a monitor screen, respectively illustrating a screen set for a picture search and a display during the picture search.

If YES, it is then determined in Step S3 whether a designation for continuously playing back audio data of a music piece is entered. The designation for continuously playing back the audio data of the music piece can be entered with a DVD setup screen which is used for an operator to previously adjust a variety of functions of the DVD player, as shown in FIG. 7A by way of example. That is, since the DVD player has a structure in which a variety of settings can be performed with a setting screen of a picture search function of the DVD setup screen as shown in the figure, a variety of functions can be set, for example, a setting function of "a search playback time interval", i.e., a playback time interval after locating the start of each piece of music, and a setting function of "designation of continuously-playing-back audio data of a music piece", i.e., a setting function for continuously supplying the audio data of the music piece so as to be played back while the DVD player is supplying video data so as to be played back for search.

In the example screen shown in FIG. 7A, the search playback time interval is set at 30 seconds so that the following piece of music is played back after a lapse of 30 seconds upon locating the start and starting the playback of each music piece. Also, the setting function for continuously supplying audio data of a music piece to be played back during searching playback is set so as to supply the music piece recorded in Track 2 by way of example. Meanwhile, when a designation for continuously playing back audio data of a specific one of music pieces is not set during the foregoing searching playback, a music piece serving as a default piece for this player, for example, a music piece in Track 1, i.e., the first recorded music piece, is automatically designated.

If the determination is YES in Step S3 of FIG. 4, DVD data of the designated music piece is received in the buffer memory in Step S4, and if NO, DVD data of the first contained music piece is received in the buffer memory in Step S8, wherein the above-mentioned DVD data includes both video data and corresponding audio data. These operations are performed so as to play back the designated music piece by supplying the designation signal set with the menu screen shown in FIG. 7A to the audio-data of music-piece continuous-playback-instruction input section 14 shown in FIG. 1, and then by supplying the input signal to the playback control section 25 through the audio-data of music-piece continuous-playback instruction section 17.

After the DVD data of a single music piece, either the music piece designated in Step S4 as mentioned above or the first recorded music piece as the default piece in Step S8, is received in the DVD-data buffer memory 18 for a single music piece, only the audio data of the DVD data received in the buffer memory is played back in Step S5, as shown in the figure by way of example.

Then, only the plurality of video data is sequentially played back, each for a predetermined time interval in Step S6. This process is performed by operating the functional sections of the video-data playback control section 20 for search shown in FIG. 1. That is, after the playback control section 25 receives audio data of a specific single music piece by the foregoing means for continuously playing back the audio data of the music piece, the start of the first music piece recorded in the DVD is located; then the first music piece is played back for a preset time interval, for example, 30 seconds as shown in FIG. 7A, and subsequently, the following music piece is played back.

Thus, when an operator is searching the contents of recorded music pieces from the aspect of video data while the video data for search is displayed on a screen, music data concurrently produced from the DVD can be continuously played back regardless of the video data by reading out a predetermined music piece from the audio-data separation and playback section 19 shown in FIG. 1. In this state, as described previously, the change-over switch 9 is switched over so as to transmit data from the audio-data separation and playback section 19 to the audio decoder 10.

Then, it is determined in Step S7 whether the playback of video data for search of all music pieces is finished. If NO, the process returns to Step S5, and the operation of sequentially playing back only the video data, each for search for a predetermined time interval, and the operation of playing back the audio data of the DVD data received in the buffer memory are repeated. When playback of a single music piece recorded in the DVD-data buffer memory 18 for a single music piece is finished in one of these operations, the music data of the same music piece is played back again from the start in accordance with the normal sequence of the video disk player according to the present invention.

Figure 7B:
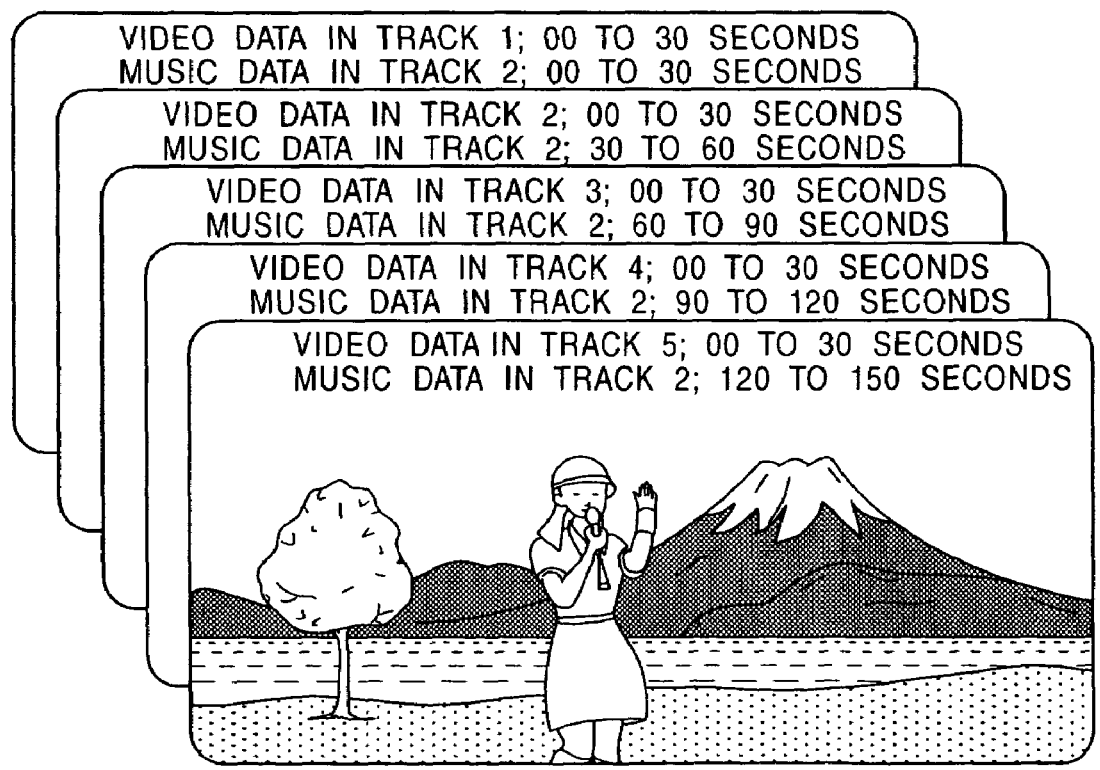

As a result of the above-mentioned operations, as shown in FIG. 7B by way of example, video data in Track 1 is first displayed from 00 seconds indicating a locating time of the start to 30 seconds indicating a predetermined time interval, and during this time interval, music data in Track 2 previously set by an operator is played from 00 seconds to 30 seconds. Then, while video data in Track 2 is likewise displayed from 00 seconds to 30 seconds, the music data in Track 2 is continuously played up to 60 seconds. Likewise, while video data in each of Tracks 3, 4, 5, etc. is displayed one after another for a time interval of 30 seconds, the music data in Track 2 is continuously played.

Meanwhile, on the occasion of recording data into the DVD-data buffer memory 18 for a single music piece, an operation in which the following music piece the second music piece is downloaded so as to serve as the foregoing predetermined music piece, in another area of the memory during a spare time of performing the foregoing variety of operations, may be continued, and the music data of the following downloaded music piece is continuously played back when the playback of the music data of the second music piece is finished. Then, when it is determined in the foregoing Step S7 that the playback of the video data for search of all music pieces is finished, the search process of the music DVD-video ends in Step S11.

According to the first embodiment shown in FIG. 4, after it is determined in the foregoing Step S1 that a search instruction is entered, when it is determined in Step S2 that the search instruction is not a picture search instruction, similar to a music search performed in a known CD player, each music piece beginning from the first one is sequentially played back as a combination of video data and corresponding music data for a predetermined time interval. Thus, in the DVD-video player, the video data and the music data of each music piece beginning from the first one are sequentially played back for a predetermined time interval in Step S9. Then, it is determined in Step S10 whether the playback of all music pieces for search is finished. If NO, the process returns to Step S9 for further playback of the video data and the corresponding music data of the following music piece; if YES, the process advances to Step S10 and this search process ends.

Although FIG. 4 illustrates an example search process in which DVD data of a single music piece, the audio data of which is to be continuously played back, is first stored in the buffer memory, and then only the video data for search is played back. Alternatively, when the DVD audio data can be stored in the buffer memory at sufficiently high speed, the search process may be arranged such that a part of the video data of the first music piece corresponding to the designated time interval of 30 seconds is stored in the buffer memory at high speed, for example, at the time of starting the operation of picture search, and is independently recorded in the buffer memory so that the part of the video data is first played back immediately.

In that case, the following operation is possible. That is, the DVD data corresponding to a single music piece for continuously playing back the audio data of the music piece is received and recorded in the buffer memory in the playback time of about 30 seconds of the video data for search; the corresponding audio data is started to be played immediately after the beginning part of the music data of the music piece becomes possible to be played thanks to the data recorded in the buffer memory; all audio data of the music piece is stored in the buffer memory during the play period and falls in a standby state for being supplied for playback; and subsequently, when the playback of the video data for the foregoing time interval of 30 seconds is finished, the start of the following music piece is located and the music piece is played back for a predetermined time interval.

Figure 5:
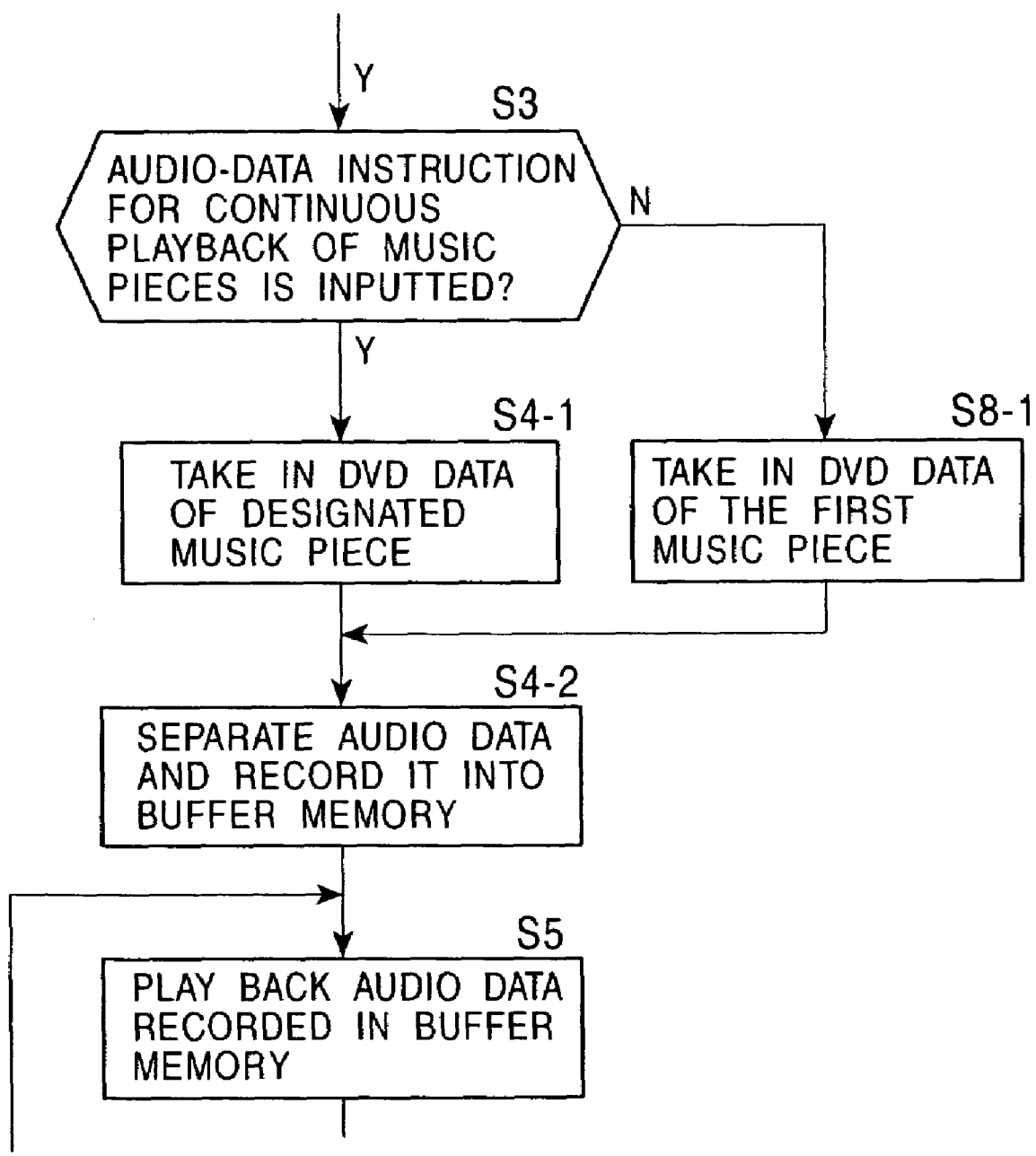
FIG. 5 is an operational flow diagram of a search operation of a music DVD-video of the video disk player shown in FIG. 2, according to the second embodiment, especially illustrating steps which are different from those shown in FIG. 4.

While the operational flow diagram shown in FIG. 4 illustrates the search process of a music DVD-video of the DVD player according to the first embodiment, having a structure illustrated by the functional block diagram shown in FIG. 1, a search process of a music DVD-video by the DVD player according to the second embodiment, having a structure illustrated by the functional block diagram shown in FIG. 2, is sequentially performed, for example, according to an operational flow diagram shown in FIG. 5 which is a modification of the search process from Steps S3 to S5 shown in FIG. 4. That is, in the example modification shown in FIG. 5, when it is determined in the foregoing Step S3 that a designation for continuously playing back the audio data of the music piece is entered, the DVD data of the designated music piece is received, in Step S4-1; subsequently, the audio data is separated from the DVD data and is recorded in the buffer memory in Step S4-2; then, the audio data recorded in the buffer memory is played back. When it is determined in Step S3 that the designation for continuously playing back the audio data of the music piece is not entered, the DVD data of the first music piece serving as a default piece is received in the buffer memory in Step S8-1 and the process advances to Step S4-2 so as to perform the same operation as mentioned above.

Figure 6:
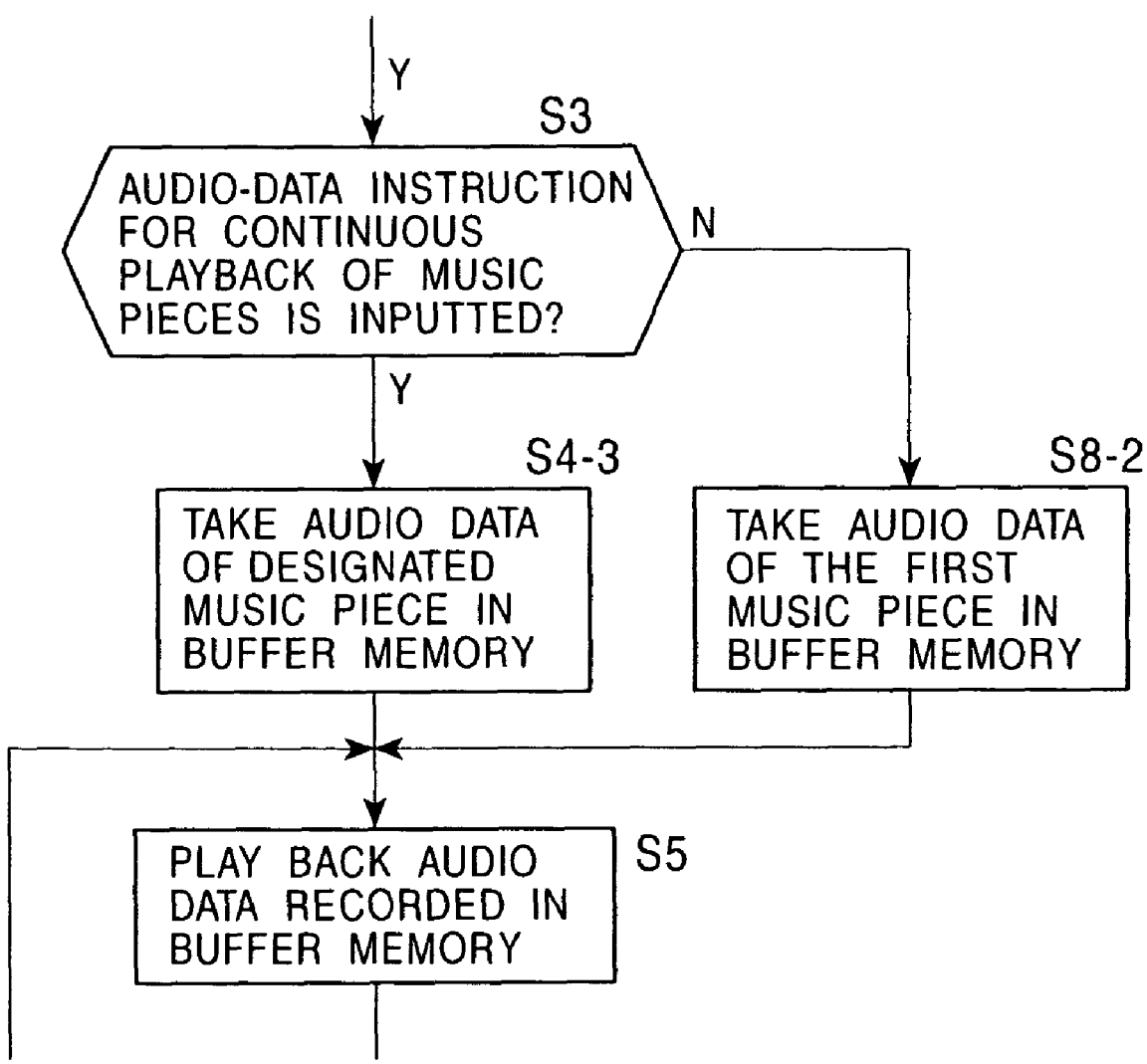
FIG. 6 is an operational flow diagram of a search operation of a music DVD-video of the video disk player shown in FIG. 3, according to the third embodiment, especially illustrating steps which are different from those shown in FIG. 4.

Also, a search process of a music DVD-video of the DVD player according to the third embodiment, having a structure illustrated by the functional block diagram shown in FIG. 3, is sequentially performed according to an operational flow diagram shown in FIG. 6 which is a modification of the search process from Steps S3 to S5 and S8 shown in FIG. 4. More particularly, it is determined in Step S3 whether a designation for continuously playing back the audio data of the music piece is entered. If YES, the audio data of the designated music piece is received in the buffer memory in Step S4-3, and then, the audio data received in the buffer memory is played back in Step S5. If NO, the audio data of the first music piece serving as a default piece is received in the buffer memory in Step S8-2, and the process advances to Step S5 so as to perform the same operation as mentioned above.

In addition to the above described embodiments, the present invention is also applicable to a video disk player in which data in a DVD-audio similar to that in a DVD-video having moving pictures recorded therein can be played back in the same way as mentioned above, and in which a recorded part of the DVD audio data in a disk for displaying a large number of attractive still pictures corresponding to each music piece can be played back in almost the same way as mentioned above.

Furthermore, the present invention is applicable to a video disk player which can play back a variety of video disks in which video data and music data are recorded in combination in an advanced type of data compression and recording format which is expected to be developed in future, other than in a data compression and recording format for the current DVD.

What is claimed is:

1. A video disk player for playing back a disk containing a plurality of music pieces, each recorded as a combination of video data and corresponding audio data, comprising:
    a video-data output section for sequentially playing back video data of a plurality of music pieces recorded in the disk, each for the same predetermined time interval, upon receipt of at least one search signal entered by an operator for searching the music pieces recorded in the disk; and
    an audio-data output section for continuously playing audio data of at least one music piece identified from music pieces recorded in the disk and different from at least some of the music pieces whose video data is played back, upon receipt of the search signal, wherein the played audio data is played back during the playback of video data of at least one music piece for which the played audio data is not recorded on the disk as corresponding audio data, and the played audio data is not as frequently changed over as the played video data during a search operation.

2. The video disk player according to claim 1, wherein the audio-data output section comprises a memory for recording the video data and the corresponding audio data of the disk, and, upon receipt of the search signal, only the audio data of the video and audio data recorded in the memory is played back.

3. The video disk player according to claim 2, wherein the audio-data output section comprises a music-piece playback instruction section for identifying a music piece previously selected from the plurality of recorded music pieces and set by an operator.

4. The video disk player according to claim 3, wherein the at least one search signal for searching the music pieces recorded in the disk includes a signal for selecting a function for playing back audio data of a music piece different from the music pieces whose video data is played back and another signal for selecting another function, and wherein, upon receipt of the search signal for selecting the other function, video data and audio data of each of the music pieces recorded in the disk are played back in combination for a predetermined time interval in the recorded order of the music pieces in the disk.

5. The video disk player according to claim 4, wherein the video-data output section comprises a playback time-interval selling section for arbitrarily selling a time interval for which each of the music pieces contained in the disk is sequentially played back.

6. The video disk player according to claim 1, wherein the audio-data output section comprises a memory for recording only audio data of the disk, and the audio data recorded in the memory is played upon receipt of the search signal.

7. The video disk player according to claim 6, further comprising a data processor, wherein the audio data to be recorded in the memory is separated from a combination of video data and corresponding audio data of a music piece different from the music pieces whose video data is played back and which are taken in from the data processor.

8. The video disk player according to claim 7, wherein the audio-data output section comprises a music-piece playback instruction section for identifying a music piece previously selected from the plurality of recorded music pieces and set by an operator.

9. The video disk player according to claim 8, wherein said at least one search signal for searching the music pieces recorded in the disk includes a signal for selecting a function for playing back audio data of a music piece different from the music pieces whose video data is played back and another signal for selecting another function, and wherein, upon receipt of the search signal for selecting the other function, video data and audio data of each of the music pieces recorded in the disk are played back in combination for a predetermined time interval in the order of the music pieces in the disk.

10. The video disk player according to claim 8, wherein the music-piece playback instruction section identifies a predetermined specific music piece when no music piece is set by an operator.

11. The video disk player according to claim 10, wherein said at least one search signal for searching the music pieces recorded in the disk includes a signal for selecting a function for playing back audio data of a music piece different from the music pieces whose video data is played back and another signal for selecting another function, and wherein, upon receipt of the search signal for selecting the other function, video data and audio data of each of the music pieces recorded in the disk are played back in combination for a predetermined time interval in the order of the music pieces in the disk.

12. The video disk player according to claim 6, further comprising a data processor, wherein the audio data to be recorded in the memory is that separated by the data processor.

13. The video disk player according to claim 12, wherein the audio-data output section comprises a music-piece playback instruction section for identifying a music piece previously selected from the plurality of recorded music pieces and set by an operator.

14. The video disk player according to claim 13, wherein said at least one search signal for searching the music pieces recorded in the disk includes a signal for selecting a function for playing back audio data of a music piece different from the music pieces whose video data is played back and another signal for selecting another function, and wherein, upon receipt of the search signal for selecting the other function, video data and audio data of each of the music pieces recorded in the disk are played back in combination for a predetermined time interval in the order of the music pieces in the disk.

15. The video disk player according to claim 1, wherein the audio-data output section comprises a music-piece playback instruction section for identifying a music piece previously selected from the plurality of recorded music pieces and set by an operator.

16. The video disk player according to claim 15, wherein said at least one search signal for searching the music pieces recorded in the disk includes a signal for selecting a function for playing back audio data of a music piece different from the music pieces whose video data is played back and another signal for selecting another function, and wherein, upon receipt of the search signal for selecting the other function, video data and audio data of each of the music pieces recorded in the disk are played back in combination for a predetermined time interval in the order of the music pieces in the disk.

17. The video disk player according to claim 1, wherein said at least one search signal for searching the music pieces recorded in the disk includes a signal for selecting a function for playing back audio data of a music piece different from the music pieces whose video data is played back and another signal for selecting another function, and wherein, upon receipt of the search signal for selecting the other function, video data and audio data of each of the music pieces recorded in the disk are played back in combination for a predetermined time interval in the order of the music pieces in the disk.

18. The video disk player according to claim 1, wherein a DVD-video is used as the disk.

19. The video disk player according to claim 1, wherein a DVD-audio is used as the disk.

20. The video disk player according to claim 1, wherein the video-data output section comprises a playback time-interval setting section for arbitrarily setting a time interval for which each of the music pieces contained in the disk is sequentially played back.

21. In a video disk player, a method for playing back a disk containing a plurality of music pieces, each recorded as a combination of video data and corresponding audio data, comprising:

sequentially playing back video data of a plurality of music pieces recorded in the disk, each for the same predetermined time interval, upon receipt of at least one search signal entered by an operator for searching the music pieces recorded in the disk; and continuously playing audio data of at least one music piece identified from music pieces recorded in the disk and different from at least some of the music pieces whose video data is played back, upon receipt of the search signal, wherein the played audio data is played back during the playback of video data of at least one music piece for which the played audio data is not recorded on the disk as corresponding audio data, and the played audio data is not as frequently changed over as the played video data during a search operation.

22. The method according to claim 21, wherein the at least one music piece whose audio data is played is previously selected from the plurality of recorded music pieces and set by an operator.

23. The method according to claim 22, wherein the video disk player identifies a predetermined specific music piece when no music piece is set by an operator.

24. The method according to claim 21, wherein the at least one search signal for searching the music pieces recorded in the disk includes a signal for playing back audio data of a music piece different from the music pieces whose video data is played back and another signal for which video data and audio data of each of the music pieces recorded in the disk are played back in combination for a predetermined time interval in the recorded order of the music pieces in the disk.

25. The method according to claim 21, wherein further comprising selling a time interval for which each of the music pieces contained in the disk is sequentially played back.

26. The method according to claim 21, wherein a DVD-video is used as the disk.

27. The method according to claim 21, wherein a DVD-audio is used as the disk.

* * * * *

UNITED STATES PATENT AND TRADEMARK OFFICE
CERTIFICATE OF CORRECTION

PATENT NO. : 7,382,967 B2  Page 1 of 1
APPLICATION NO. : 10/653691
DATED : June 3, 2008
INVENTOR(S) : Taku Oikawa It is certified that error appears in the above-identified patent and that said Letters Patent is hereby corrected as shown below:

On the Title Page

In column 1, item (75), delete "Kawaguchi" and substitute --Kawaguchi-city-- in its place.

In the Claims

In column 16, claim 5, line 33, delete "selling section for arbitrarily selling" and substitute --setting section for arbitrarily setting-- in its place.

In column 18, claim 25, line 46, before "a time interval" delete "selling" and substitute --setting-- in its place.

Signed and Sealed this

Fourteenth Day of April, 2009

JOHN DOLL
*Acting Director of the United States Patent and Trademark Office*